United States Patent [19]

Gruner et al.

[11] 4,345,465
[45] Aug. 24, 1982

[54] PROBE FOR MEASURING FLOW RATE AND/OR TEMPERATURE OF A FLOWING MEDIUM

[75] Inventors: Heiko Gruner, Gerlingen; Heinz Friedrich, Stuttgart, both of Fed. Rep. of Germany

[73] Assignee: Robert Bosch GmbH, Stuttgart, Fed. Rep. of Germany

[21] Appl. No.: 147,713

[22] Filed: May 8, 1980

[30] Foreign Application Priority Data

May 15, 1979 [DE] Fed. Rep. of Germany ....... 2919433

[51] Int. Cl.³ .............................................. G01F 1/68
[52] U.S. Cl. ....................................... 73/204; 73/118; 374/142
[58] Field of Search .................. 73/204, 362 AR, 118; 338/22 R, 25

[56] References Cited

U.S. PATENT DOCUMENTS

| | | | |
|---|---|---|---|
| 2,389,915 | 11/1945 | Kleimack et al. | 338/22 R |
| 3,343,114 | 9/1967 | Rice | 338/25 X |
| 3,575,053 | 4/1971 | Telinde | 73/362 AR |
| 3,931,736 | 1/1976 | Olmstead | 73/204 |
| 3,966,578 | 6/1976 | Sommer | 338/22 R X |
| 3,992,940 | 11/1976 | Platzer, Jr. | 73/204 |
| 4,079,350 | 3/1978 | Sentementes et al. | 338/22 R |

FOREIGN PATENT DOCUMENTS 1904029  8/1970  Fed. Rep. of Germany.
2527505  1/1976  Fed. Rep. of Germany.

*Primary Examiner*—Jerry W. Myracle
*Attorney, Agent, or Firm*—Frishauf, Holtz, Goodman & Woodward

[57] ABSTRACT

A carrier strip of polyimide resin sheet material carries on one face an etched pattern of metallization comprising temperature-independent resistors formed of an underlying metallization layer of tantalum base, temperature-dependent resistors in which the effect of the upper layer of metallization, of a nickel base, is predominant, and conductive paths provided by broader strips of the nickel base material. A cover layer of the same heat-resistant resin sheet material is sealed and bonded to the carrier strip wherever a metallization layer does not intervene, taking care to leave open certain contact areas for the attachment of connecting leads. A holder structure holds the strips at each end and provides clear space for attaching connecting leads as well. The holder structure is designed to allow the flow of medium to pass in good thermo contact with the portion of the device enclosing the resistance elements.

6 Claims, 3 Drawing Figures

PROBE FOR MEASURING FLOW RATE AND/OR TEMPERATURE OF A FLOWING MEDIUM

This invention concerns a probe for measuring the rate of flow, the temperature, or both of a flowing gas or other fluid, and particularly a probe suited for measuring the rate of flow or temperature of intake air and/or fuel of an internal combustion engine. More particularly, it concerns a probe in which one or more layer-type resistors is provided on a carrier which is disposed in the flow medium to be measured, the resistor being connected in an electrical measuring circuit.

Among the known probes for measurements in a flow of gas or other fluid, there is one in which a temperature-dependent resistance provided in the form of a layer has direct contact with the flowing medium, with the result that it is exposed to attack of a flow medium which is corrosive to the resistance layer and, furthermore, errors result from possible electrical conductivity of the medium and/or by change of the heat transfer resistance. According to another proposal, the temperature-dependent resistance is put on a carrier and is provided with a thin protective layer on its surface facing the flowing medium. This arrangement has the disadvantage that on account of the non-negligible mass of the carrier, the latter has a certain heat capacity. The heat flow between the temperature-dependent measuring resistance and the carrier leads to a diminution of the response time of the temperature-dependent measuring resistance under changes in the flowing mass of the medium.

SUMMARY OF THE INVENTION

It is an object of the invention to provide a sensor probe that is safe from corrosive or similar attack by its environment and, on the other hand, is subject to practically no response delay resulting from the carrier material.

Briefly, a thin sheet of heat-resistant synthetic resin is used as the carrier and bears on one side thereof a resistor layer in a pattern such as to provide one or more resistors and also conducting paths, and a second thin sheet of heat-resistant synthetic resin is applied over the resistance layer and the carrier, leaving free the contact locations for connection leads for the resistors, the second sheet being sealed and bonded to the first sheet, except where resistance or conducting layers intervene, and outside of the region of the carrier taken up by the resistances, leaving free space for the attachment of leads at the contact locations, the carrier is so set in a self-supporting holder that the flowing medium has unimpeded access to the resistances for transfer of heat between the medium and the resistance.

The resistance layer system preferably consists essentially of nickel underlaid by a layer substantially of tantalum.

The sheets of heat-resistant synthetic resin are preferably sheets of polyimide resin and preferably have a thickness in the range from 12 to 100 $\mu$m. They are preferably provided with a hydrophobic coating on their outer surfaces consisting of a dielectric corrosion-resistant pinhole-free protective layer produced from starting polymers such as hexamethyldisiloxane, hexafluoropropylene, or the like. The coating is less than 4 $\mu$m thick, preferably 0.5 $\mu$m thick.

The method of making the probe consists of metallizing an entire side of the carrier sheet with a layer system of resistance material, preferably under vacuum and by sputtering, then by use of a mask and an etching process producing temperature-dependent resistances and temperature-independent resistances, as well as associated conductive paths, and thereafter covering the carrier with the remains of the layer system with a second temperature-resistant sheet of synthetic resin, again preferably a polyimide resin, except for contact areas left free for external connections, sealing and bonding the two resin sheets together, either by thermoplastic welding or by chemical action bonding, and finally applying the self-supporting holder in a way that leaves cavities for the attachment of leads. Preferably, before the holder is applied, a hydrophobic coating is provided on the outer surfaces of the synthetic resin sheets.

BRIEF DESCRIPTION OF THE DRAWINGS

The invention is further described by way of illustrative example with reference to the annexed drawings, in which.

DESCRIPTION OF A PREFERRED EMBODIMENT

Figure 1:
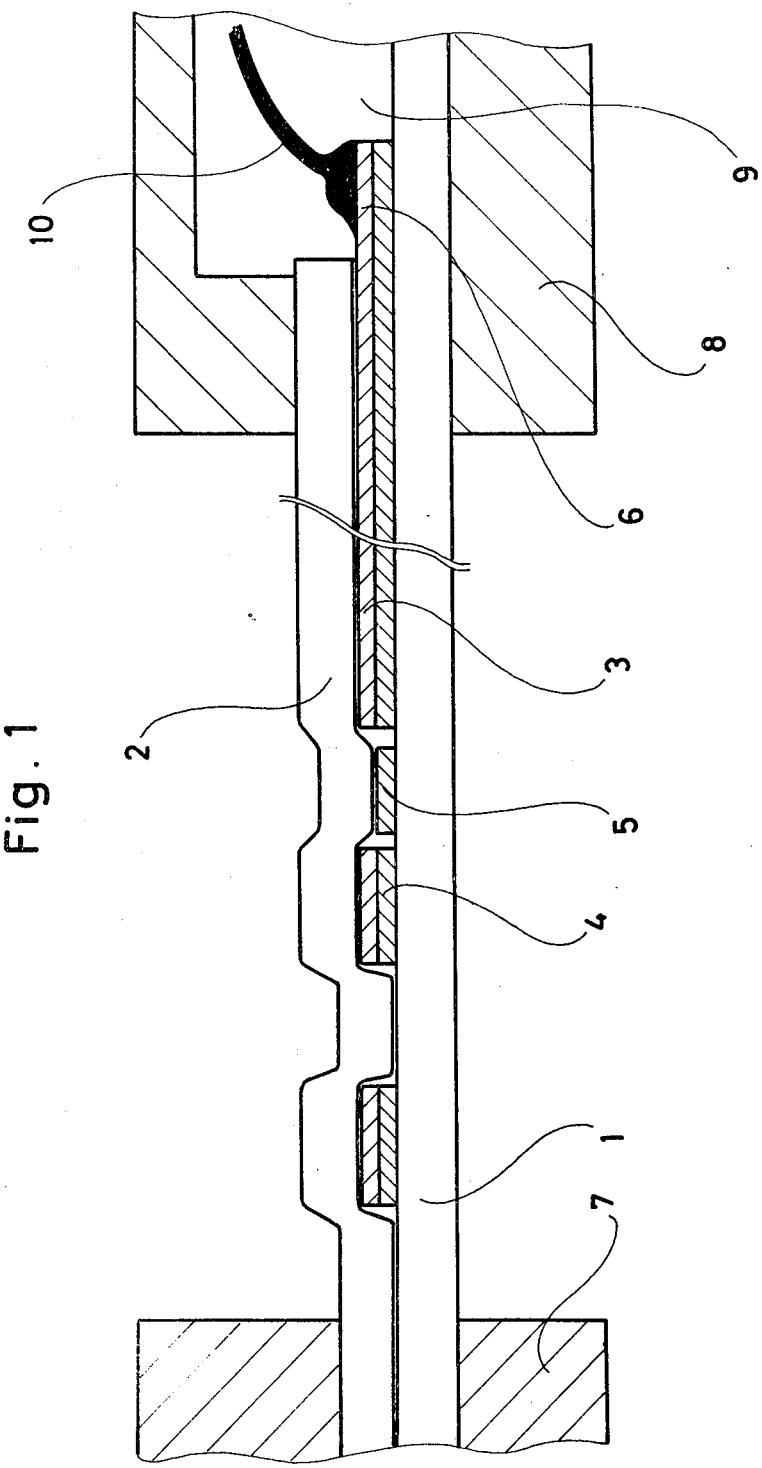
FIG. 1 is a simplified and enlarged cross-section of a sensor probe according to the invention having at least one temperature-dependent resistor and one temperature-independent resistor.
Figure 2:
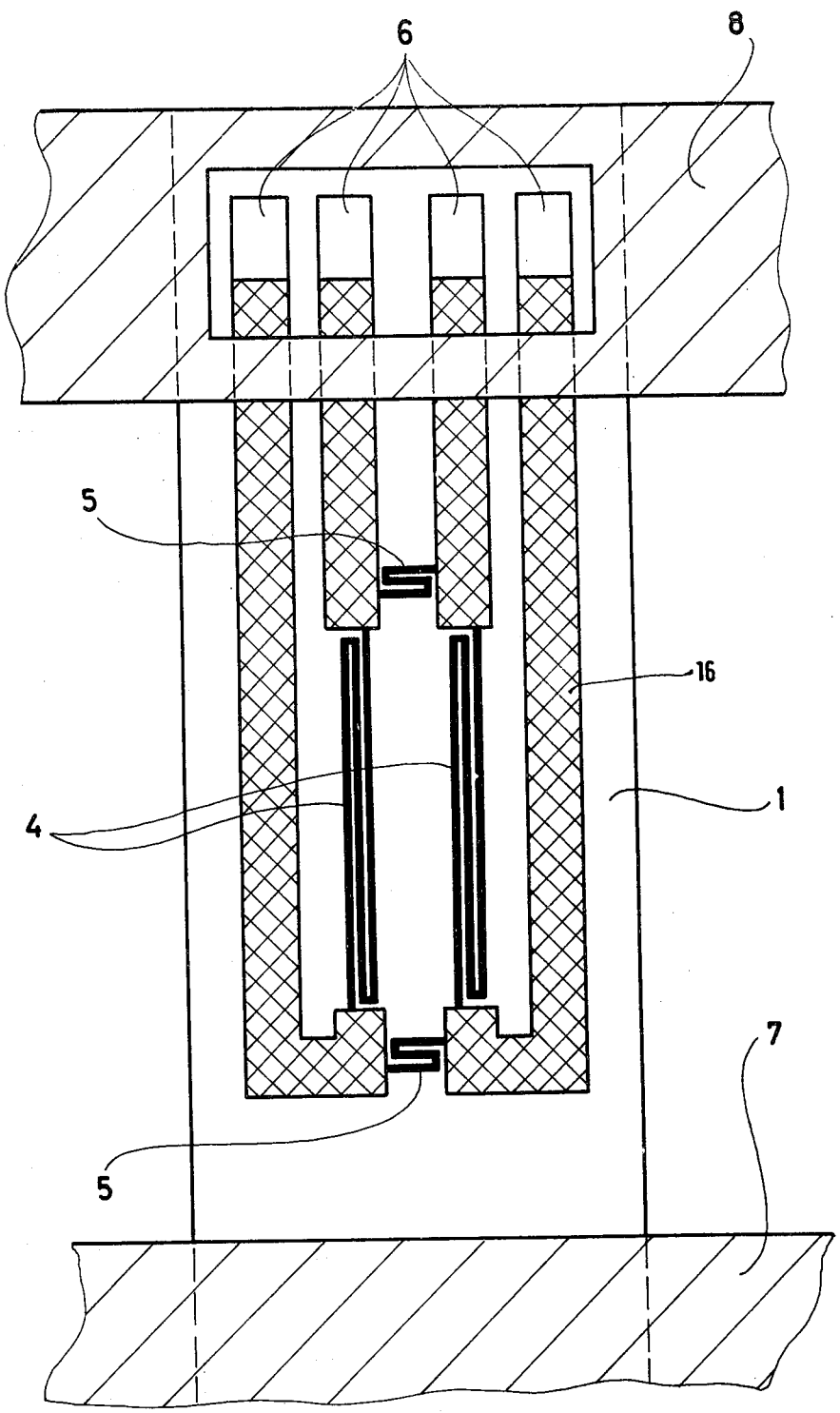
FIG. 2 is a plan view of a somewhat similar sensor probe with the upper synthetic resin sheet removed in order to illustrate more clearly the conducting paths and resistances.

FIG. 2 is a plan view of a sensor probe according to the invention, and FIG. 1 is a cross-section that illustrates cross-sections of the various elements of FIG. 2 but does not correspond to a particular section of the device shown in FIG. 2. The sensor probe consists of a strip of sheet material, for example of polyimide with a cover layer of fluorocarbon material on one or both sides, and a second sheet 2 of the same material. The sheet material strip 1 was initially metallized over its whole surface on one side with a layer system 3 of electrical resistance material by deposition in vacuum, as for example by sputtering. Then, by means of a mask and etching process, this full surface layer was converted into a pattern grouping temperature-dependent resistors 4, temperature-independent resistors 5 and conductive paths 16, the temperature-independent resistance layer consisting essentially of the lower layer of tantalum base, the temperature-dependent layer being built up essentially of a nickel base material, while the conductive paths are of the same nickel base, but do not have the resistance increased by serpentine etching. It is also possible to improve the conductivity of the conductive paths by depositing a layer of copper or of aluminum, but for practical purposes, the broad nickel path is adequate. The tantalum layer underlies the nickel layer where the latter is present, but the characteristics of the nickel layer predominate, because its resistance is lower.

If the resistances and conductive paths necessary for the particular application in question are produced by a mask and etching process, it is possible to subject the component group thus formed to precise trimming of the resistance value by trimming off material and, in the case of the temperature-independent layer which is of tantalum, the resistance trimming or calibration can be provided by anodic oxidation, which has the same effect as removing conductive material.

Thereafter, the upper sheet of resin 2 is superposed and is sealed and bonded to the sheet strip 1 at all locations at which neither resistances or conductive paths occupy an intermediate position, this being done by thermoplastic bonding (welding) and/or by a chemical reaction (for example resin cross-linking), care being taken to leave free the contact areas 6 for connection leads. The sensor thus obtained is then mechanically positioned by self-supporting streamline holders 7,8 in such a way that an optimum thermal decoupling between the measuring resistances and the holders is maintained and cavities 9 are left clear for the attachment of connecting leads.

It is desirable in such a structure to furnish to the external surfaces of the sheet strips 1 and 2 a hydrophobic coating having a protective layer of dielectric, corrosion-resistant and pinhole-free character of a material produced with starting polymers such as hexamethyldisiloxane, hexafluoropropylene, or the like, in order to prevent dirt contamination of the surface and thus also any change in the response speed of the device.

The thickness of the sheet strips 1 and 2 lies between 12 and 100 $\mu$m, the particular thickness being suited to the necessary speed of response, the thinner strips providing the faster response, while a thicker strip is somewhat less delicate. The thickness of the hydrophobic protective layer is desirably under 4 $\mu$m and is preferably about 0.5 $\mu$m.

Figure 3:
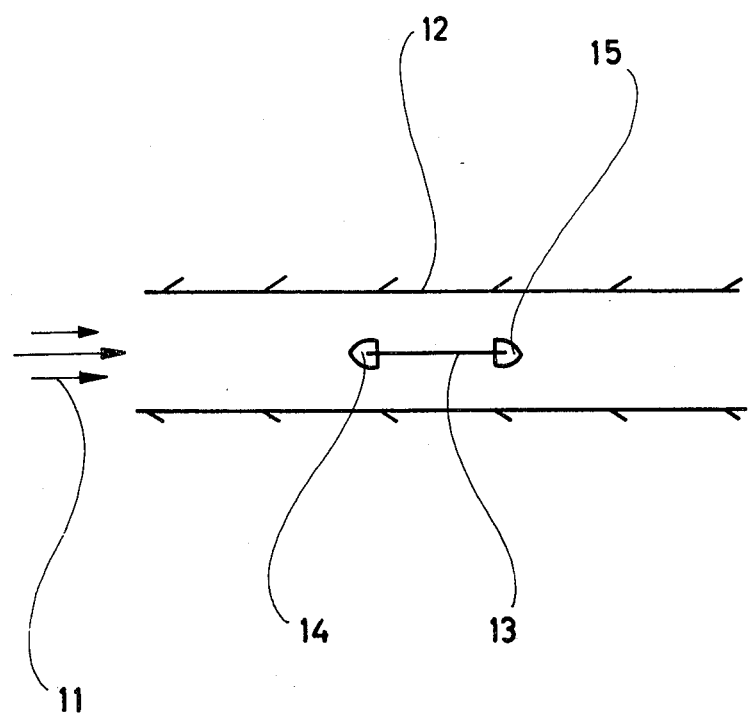
FIG. 3 is a diagrammatic representation of a sensor of the kind of FIG. 1 disposed in position for making measurements with respect to the flow of a gas in a pipe, such as the intake pipe of an internal combustion engine.

FIG. 3 shows schematically the disposition of a sensor probe according to the invention in a channel 12 through which a medium 11 flows. The sensor consisting of the sheet strips 1 and 2 and containing resistances 4,5 and the conductive paths 16 is designated in this case 13, while the self-supporting holding means are designated 14 and 15. FIG. 3 particularly makes clear the good thermal decoupling, according to the invention, between the holding clamps and the previously mentioned layer system from which the resistor components have been formed. Some embodiments of the invention for measuring rate of flow and/or temperature of the fluid can consist on only one temperature-dependent resistor 4, or either one or two temperature-dependent resistances 4 with correspondingly one or two temperature-independent resistances 5 for connection in a half or full bridge circuit, all in a double sheet structure such as has been already described, or one temperature-dependent resistance 4 on each of two separate double sheet devices with temperature-independent resistors 5 on one of the two double resin-sheet devices for completion of a full bridge, in which case the effect of the temperature of the flowing medium on the rate of flow measurement can be compensated.

Although the invention has been described in detail with reference to a particular illustrative embodiment, it will be understood that variations and modifications are possible within the inventive concept.

We claim:

1. A probe for measuring the rate of flow and/or temperature of a flowing medium, suitable for measurement of air and/or fuel intake flow of internal combustion engines, said probe having at least one temperature dependent resistor provided on a carrier disposed in a flow channel or duct of a fluid medium and having the improvement which consists in that:

said carrier is a thin heat-resistant synthetic resin sheet and carries in a pattern load down on one of its faces an electrical resistor layer comprising a tantalum layer lying directly on said resin sheet overlaid by a nickel layer in portions of said pattern for producing temperature dependence of resistance, said pattern being extended so as to provide conducting paths, for connecting resistors, said paths comprising extensions of the said tantalum layer directly lying on said resin sheet completely overlaid in said extended pattern with said nickel layer;

said carrier and said layers thereon are covered by a second heat-resistant thin synthetic resin sheet (2), except for connection contact locations of said connecting paths serving at least one resistor provided by said resistor layer, which locations are left free by said second sheet, said second sheet being sealed and bonded to said carrier substantially everwhere where said carrier is not covered by the resistors (4,5) formed by said resistor layer and by said conducting paths (16), and the carrier and its layers and covering sheet are held in two spaced locations in a mechanical self-supporting holder (7,8,14,15) which leaves free cavities (9) for lead connections to said contact location in such a manner that said flowing medium (11) has unimpeded heat conducting access to the regions occupied by said at least one resistor.

2. A probe for measuring the rate of flow and/or temperature of a flowing medium, suitable for measurement of air and/or fuel intake flow of internal combustion engines, said probe having at least one temperature dependent resistor provided on a carrier disposed in a flow channel or duct of a fluid medium and having the improvement which consists in that:

said carrier is a thin heat-resistant synthetic resin sheet and carries in a pattern laid down on one of its faces an electrical resistor layer, said pattern being extended so as to provide conducting paths connecting resistors;

said carrier and said layers thereon are covered by a second heat-resistant thin synthetic resin sheet (2), except for connection contact locations (6) for at least one resistor provided by said resistor layer, which are left free by said second sheet, said second sheet being sealed and bonded to said carrier substantially everywhere where said carrier is not covered by the resistors (4,5) formed by said resistor layer and by said conducting paths (16);

the outer surfaces of said synthetic resin sheets (1,2) are provided with a hydrophobic coating of a dielectric, corrosion-resistant, pinhole-free material made from starting polymeric material selected from the group consisting of methyldisiloxanes and fluorinated alkylenes, and the carrier and its layers and covering sheet are held in two spaced locations in a mechanical self-supporting holder (7,8,14,15) which leaves free cavities (9) for lead connections to said contact location in such a manner that said flowing medium (11) has unimpeded heat conducting access to the regions occupied by said at least one resistor.

3. A probe for measuring the rate of flow and/or temperature of a flowing medium, suitable for measurement of air and/or fuel intake flow of internal combustion engines, said probe having at least one temperature dependent resistor provided on a carrier disposed in a flow channel or duct of a fluid medium and having the improvement which consists in that:

said carrier is a thin heat-resistant synthetic resin sheet and carries in a pattern laid down on one of its faces an electrical resistor layer, said pattern being extended so as to provide conducting paths connecting resistors;

said carrier and said layers thereon are covered by a second heat-resistant thin synthetic resin sheet (2), except for connection contact locations (6) for at least one resistor provided by said resistor layer, which are left free by said second sheet, said second sheet being sealed and bonded to said carrier substantially everywhere where said carrier is not covered by the resistors (4,5) formed by said resistor layer and by said conducting paths (16);

the outer surfaces of said synthetic resin sheets (1,2) are provided with a hydrophobic coating of a dielectric, corrosion-resistant, pinhole-free material made from starting polymeric material selected from the group consisting of methyldisiloxanes and fluorinated alkylenes, said coating having a thickness less than 4 $\mu$m, and the carrier and its layers and covering sheet are held in two spaced locations in a mechanical self-supporting holder (7,8,14,15) which leaves free cavities (9) for lead connections to said contact location in such a manner that said flowing medium (11) has unimpeded heat conducting access to the regions occupied by said at least one resistor.

4. A probe for measuring the rate of flow and/or temperature of a flowing medium, suitable for measurement of air and/or fuel intake flow of internal combustion engines, said probe having at least one temperature dependent resistor provided on a carrier disposed in a flow channel or duct of a fluid medium and having the improvement which consists in that:

said carrier is a thin heat-resistant synthetic resin sheet and carries in a pattern laid down on one of its faces an electrical resistor layer, said pattern being extended so as to provide conducting paths connecting resistors;

said carrier and said layers thereon are covered by a second heat-resistant thin synthetic resin sheet (2), except for connection contact locations (6) for at least one resistor provided by said resistor layer, which are left free by said second sheet, said second sheet being sealed and bonded to said carrier substantially everywhere where said carrier is not covered by the resistors (4,5) formed by said resistor layer and by said conducting paths (16);

the outer surfaces of said synthetic resin sheets (1,2) are provided with a hydrophobic coating of dielectric, corrosion-resistant, pinhole-free material made form starting polymeric material selected from the group which consists of hexamethyldisiloxane and hexafluoropropolyene, said coating having a thickness in the neighborhood of 0.5 $\mu$m, and the carrier and its layers and covering sheet are held in two spaced locations in a mechanical self-supporting holder (7,8,14,15) which leaves free cavities (9) for lead connections to said contact location in such a manner that said flowing medium (11) has unimpeded heat conducting access to the regions occupied by said at least one resistor.

5. A probe as defined in claim 1, 2, 3 or 4, in which said heat-resistant synthetic resin materials are a polyimide resin.

6. A probe as defined in claim 5, in which said sheets (1,2) of synthetic resin have a thickness in the range from 12 to 100 $\mu$m.

* * * * *